United States Patent Office.

ARTHUR LIEBRECHT, OF FRANKFORT-ON-THE-MAIN, GERMANY, ASSIGNOR TO FARBWERKE, VORM. MEISTER, LUCIUS & BRÜNING, OF HÖCHST-ON-THE-MAIN, GERMANY.

COMPOUND OF SILVER AND GELATOSE AND PROCESS OF MAKING SAME.

SPECIFICATION forming part of Letters Patent No. 681,482, dated August 27, 1901.

Application filed December 21, 1900. Serial No. 40,686. (Specimens.)

*To all whom it may concern:*

Be it known that I, ARTHUR LIEBRECHT, Ph. D., a citizen of the Empire of Germany, residing at Frankfort-on-the-Main, Germany, have invented a Compound of Silver and Gelatose and a Process of Making the Same, of which the following is a specification.

I have made the important observation that from gelatoses neutral silver compounds of high percentage and soluble in water may be obtained, in which compounds the silver is linked in a masked manner, being therefore valuable in therapeutics.

To obtain this new silver compound I proceed as follows: The aqueous solution of gelatoses is neutralized, and then salts of silver are added—such, for instance, as nitrate of silver, acetate of silver, silver succinimid—and the mixture is evaporated to dryness. In working with great quantities it is necessary to evaporate in a very feeble alkaline solution in order to obtain a thoroughly neutral and final product.

The process may be modified as follows: The silver oxid is dissolved in solutions of gelatoses, then neutralized with acid, and further worked as above.

By "gelatoses" I mean products of elimination obtained from glutin and aldehyde-glutin with acids or alkalies, by boiling with water at ordinary or high pressure, also in acid, alkaline, or salt solution, by putrefaction, digestion, and which are known in literature as "glutoses," (proto, deutero, &c., glutose,) "glue peptone," "glue albumose," "semiglutin," "hemicollin," &c.

Example: Ten grams of gelatose are dissolved in ten grams of water on the waterbath and mixed after neutralization with 1.5 gram of nitrate of silver in five cubic centimeters of water. The mixture is evaporated *in vacuo* to dryness. The salt of silver thus obtained is a yellow-white powder soluble in water with a neutral reaction. Aqueous solutions of fifty per cent. even may be obtained easily. Alcohol separates the salt of silver from concentrated aqueous solutions. Specific silver reagents—such, for instance, as diluted hydrochloric acid, a solution of common salt, or hydrogen sulfid—produce no precipitate with solutions of the new salt of silver. A solution of hexamethylenetetramine produces an easily-soluble precipitate with an excess of the precipitating agent. The solution is evaporated to an easily-soluble powder. By evaporating the solutions of the salts of silver with solutions of urea, piperazin, &c., easily-soluble double compounds may be obtained.

The new salts of silver serve as antiseptic, especially in the treatment of gonorrhea, 0.1 to 0.2 grams if containing fifteen per cent. of silver and 0.2 to 0.5 grams if containing seven and one-half per cent.

Having now described my invention, what I claim is—

1. The herein-described process for the manufacture of neutral, soluble silver compounds of high percentage, which consists in neutralizing solutions of gelatoses and combining them with the solution of a salt of silver and then drying them, substantially as set forth.

2. As a new compound the product obtained from gelatose as herein described, being a yellow-white powder, easily soluble in water with a neutral reaction, insoluble in alcohol and acetone, its solution giving no precipitate with hydrochloric acid, a solution of common salt, or hydrogen sulfid.

In testimony that I claim the foregoing as my invention I have signed my name in presence of two subscribing witnesses.

ARTHUR LIEBRECHT.

Witnesses:
HEINRICH HAHN,
ALFRED BRISBOIS.